United States Patent
Zhai et al.

(10) Patent No.: US 9,716,871 B2
(45) Date of Patent: Jul. 25, 2017

(54) YUV SIGNAL GENERATION FOR HIGH DYNAMIC RANGE VIDEO CONTENT

(71) Applicant: Apple Inc., Cupertino, CA (US)

(72) Inventors: Jiefu Zhai, San Jose, CA (US); Yeping Su, Sunnyvale, CA (US); Hsi-Jung Wu, San Jose, CA (US); Chris Y. Chung, Sunnyvale, CA (US); Xiaosong Zhou, Campbell, CA (US); Ke Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 14/603,109

(22) Filed: Jan. 22, 2015

(65) Prior Publication Data
US 2016/0094823 A1    Mar. 31, 2016

Related U.S. Application Data

(60) Provisional application No. 62/057,920, filed on Sep. 30, 2014.

(51) Int. Cl.
*H04N 9/67* (2006.01)
*H04N 9/64* (2006.01)
*H04N 1/64* (2006.01)

(52) U.S. Cl.
CPC .............. *H04N 9/67* (2013.01); *H04N 1/646* (2013.01); *H04N 9/646* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,023,199 A * | 5/1977 | Netravali | ............. | H04N 11/046 375/240.25 |
| 4,597,005 A * | 6/1986 | Baleshta | .............. | H04N 11/042 348/463 |
| 4,819,061 A * | 4/1989 | Lang | ........................ | H04N 9/78 348/666 |
| 5,012,329 A * | 4/1991 | Lang | ...................... | H04N 9/646 348/606 |
| 8,334,911 B2 * | 12/2012 | Jia | ............................ | H04N 9/67 348/222.1 |
| 2003/0118183 A1 * | 6/2003 | Struyk | .................... | G06F 21/84 380/213 |
| 2004/0213349 A1 * | 10/2004 | Zador | .................... | G06T 9/008 375/240.22 |

(Continued)

FOREIGN PATENT DOCUMENTS

WO     2014107255 A1    7/2014

*Primary Examiner* — Anand Bhatnagar
(74) *Attorney, Agent, or Firm* — Baker Hostetler LLP; Robert L. Hails

(57) ABSTRACT

An encoder may include a luma transform, a transformer, and a chroma transform. The luma transform may determine a linear luminance value based upon a plurality of primary color values of a pixel. The transformer may generate a transformed luminance value based upon the linear luminance value and a plurality of transformed color values based upon corresponding more than one of the primary color values of the pixel. The chroma transform may determine a plurality of chroma values based upon corresponding plurality of transformed color values and the transformed luminance value of the pixel.

40 Claims, 5 Drawing Sheets

(56) References Cited

U.S. PATENT DOCUMENTS

| | | | |
|---|---|---|---|
| 2007/0070216 A1* | 3/2007 | Yabe | H04N 9/735 348/229.1 |
| 2007/0140554 A1* | 6/2007 | Strom | H04N 19/105 382/166 |
| 2012/0251012 A1* | 10/2012 | Ikai | H04N 19/44 382/232 |
| 2012/0281009 A1 | 11/2012 | Ward et al. | |
| 2014/0003497 A1 | 1/2014 | Sullivan et al. | |
| 2014/0044372 A1 | 2/2014 | Mertens | |
| 2016/0005153 A1* | 1/2016 | Atkins | G06T 5/007 345/591 |
| 2016/0191159 A1* | 6/2016 | Aoyama | H04N 21/436 398/172 |

* cited by examiner

100

(b)

(a)

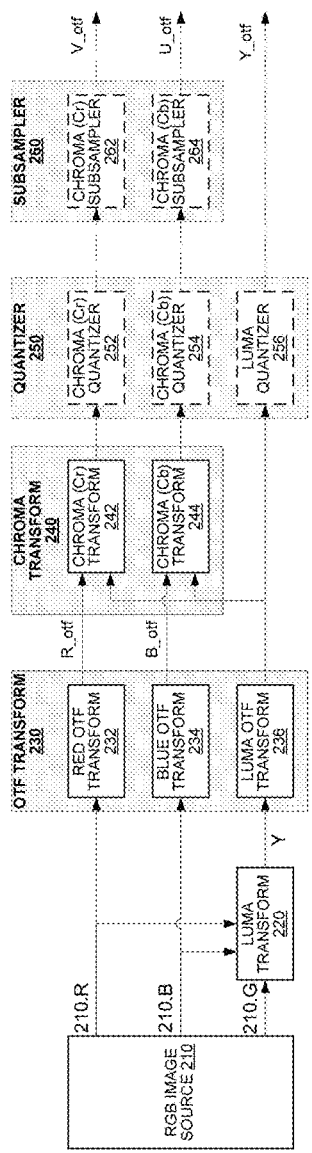
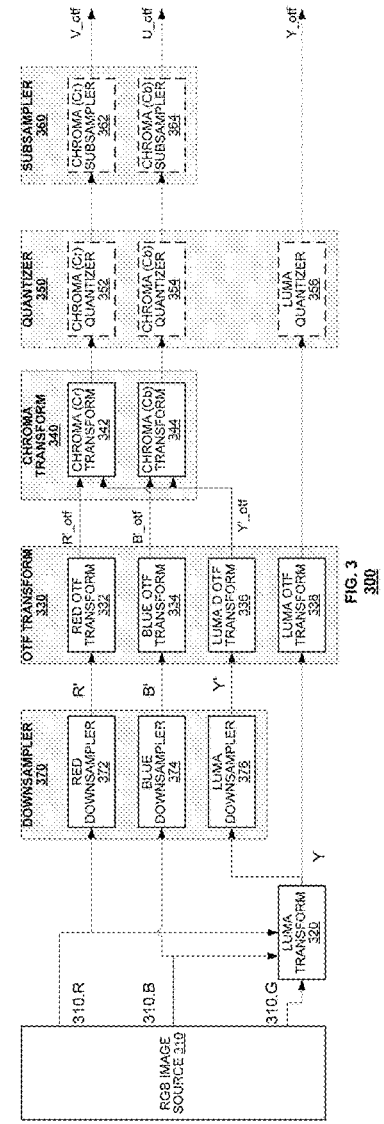
FIG. 2
200
FIG. 3
300

400

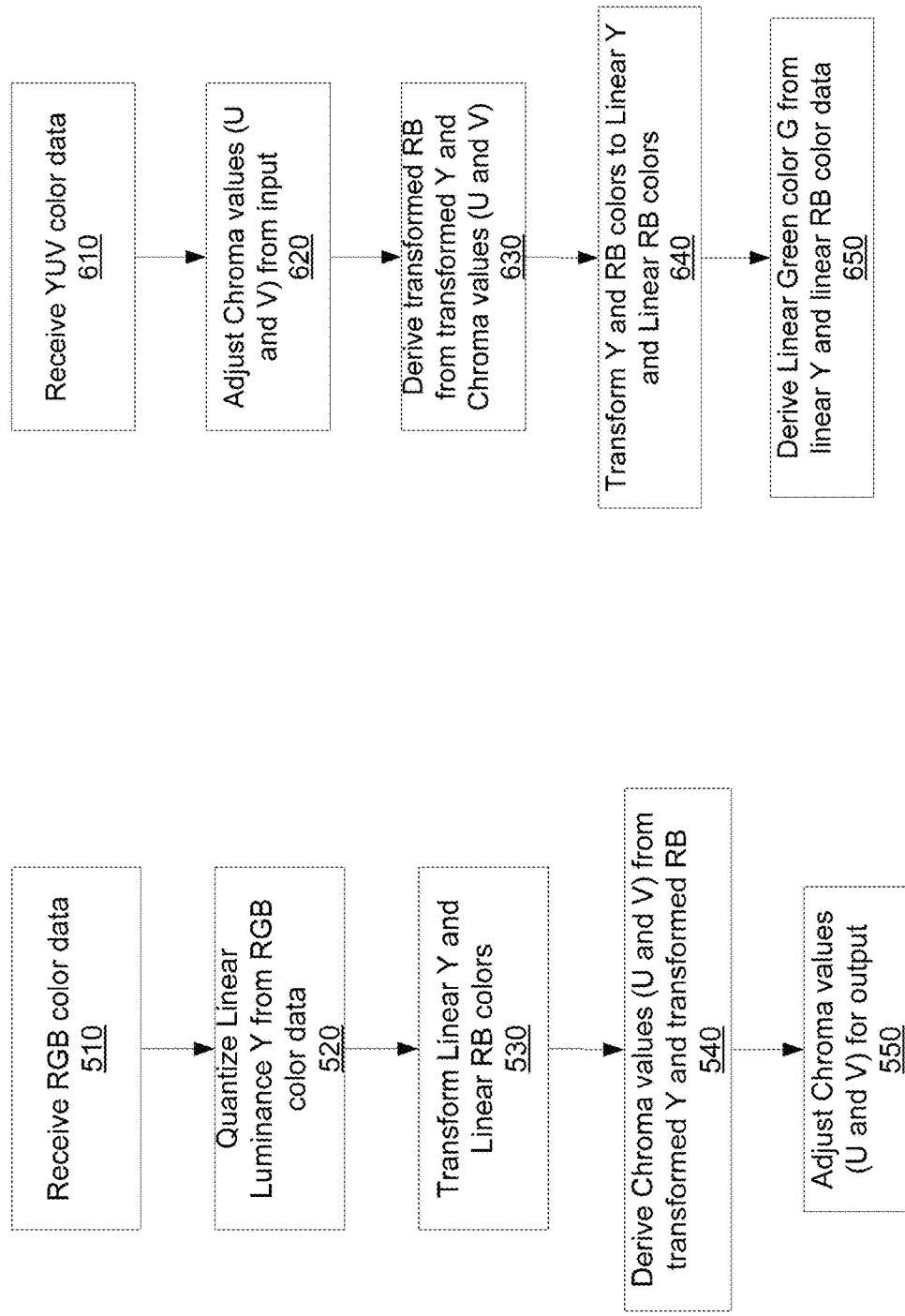

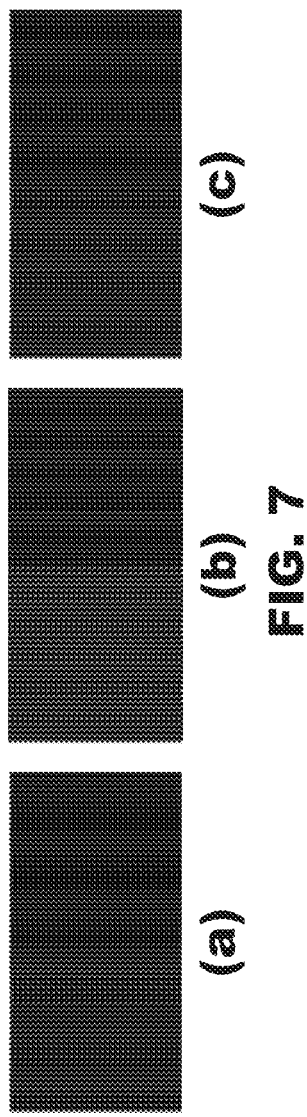

YUV SIGNAL GENERATION FOR HIGH DYNAMIC RANGE VIDEO CONTENT

RELATED APPLICATIONS

This application benefits from priority of U.S. Provisional Application No. 62/057,920, filed Sep. 30, 2014, which is incorporated herein by reference.

BACKGROUND

In image capture and encoding applications, high dynamic range (HDR) video content data often is represented by a Red-Green-Blue ("RGB") color space defined by a predetermined protocol such as ITU-R Recommendation BT.709 (also "Rec709"), ITU-R Recommendation BT.2020 (also "Rec2020") or SMPTE's DCI P3. To transmit the HDR data over a network or to record the data on a storage device, it may be efficient to convert the HDR data to a more efficient color space such as a YUV color space. Conversion to YUV often reduces the HDR data size and facilitates compression processes which further reduce its data size. For display, however, the video content is decoded and reconverted back to RGB color space.

Conversion operations typically involve multiple stages of processing. Pixels may be represented as an RGB "triplet" of image data having a red component, a green component and a blue component. Each component of the triplet may be processed by an optical transfer function (OTF) conversion stage, which adjusts each component by a factor that represents non-linearities either in a capture device the generated the RGB data or a display device that will consume the RGB data. Following OTF conversion, the RGB data may be transformed to the YUV color space by a linear transform. The transformed YUV data may be quantized to conform each Y, U and V component to a target bitdepth. Finally, the quantized U and V components may be downsampled to match the U and V data to a subsampling protocol of the YUV data (e.g., 4:2:2, 4:2:0 or other subsampling protocol).

The conversion of the HDR image from the RGB color space to a second color space and back to the RGB color space may introduce visual artifacts to the video content. The artifacts are particularly noticeable in image regions where content is either uniform or possesses gradual change in content and they may appear as block-shaped non-uniformities that interrupt the image content. FIG. 1 illustrates an example of such non-uniformities. FIG. 1(a) illustrates exemplary source content obtained in an RGB color space. FIG. 1(b) illustrates the source content having been converted from the RBG color space, to a YUV color space and back to RGB. The conversion generates block-based discontinuities in image content that likely will be perceived as annoying artifacts by a viewer, particularly for generally uniform image content.

The inventors have identified a need in the art for an improved color space conversion protocol for video that avoid introduction of artifacts in image content.

BRIEF DESCRIPTION OF THE DRAWINGS

FIG. 2 illustrates an encoder according to an embodiment of the present invention.

FIG. 3 illustrates an encoder according to another embodiment of the present invention.

FIG. 5 illustrates a method according to an embodiment of the present invention.

FIG. 6 illustrates a method according to another embodiment of the present invention.

FIG. 7 illustrates exemplary image data that demonstrates advantages of the foregoing embodiments.

DETAILED DESCRIPTION

Figure 1:
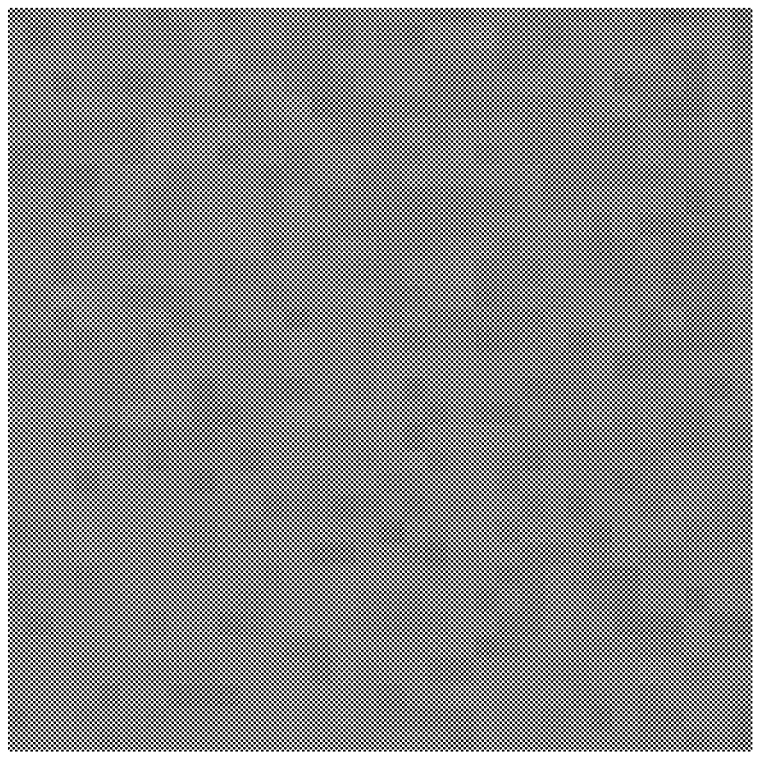
FIG. 1 illustrates an example of coding artifacts that arise in typical RGB to YUV conversion processes.
Figure 1:
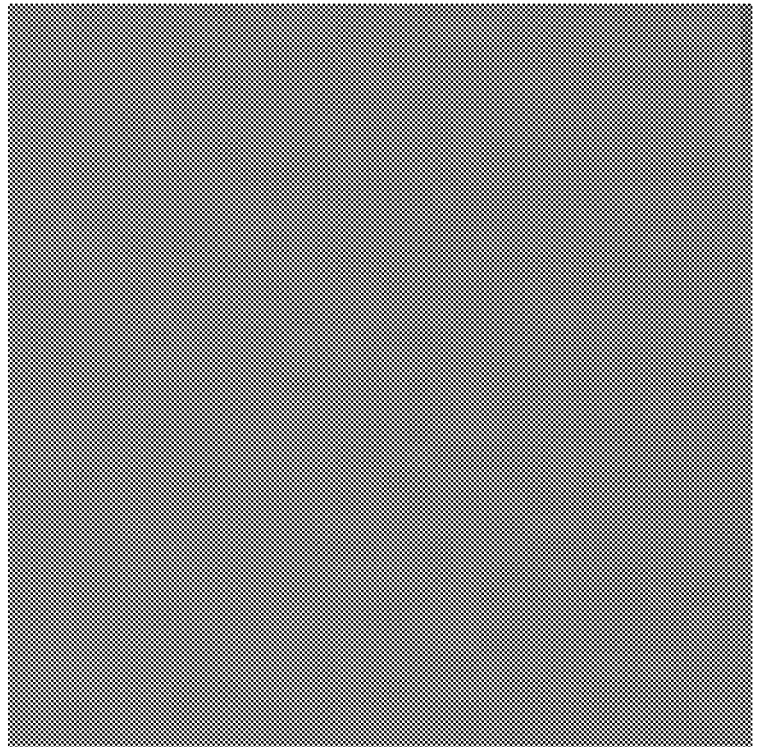

According to an embodiment, an encoder may include a luma transform, an OTF transform, and a chroma transform. The luma transform may determine a linear luminance value directly from RGB components of a pixel. The OTF transform may generate a transformed luminance value from the linear luminance value output by the luma transform and it may generate transformed red and blue color values from the red and blue components of the source pixel. The chroma transform may convert the OTF-transformed red and blue values to corresponding chrominance values. By performing luma conversion before applying an OTF transform, image artifacts may be reduced in RGB to YUV to RGB conversions.

FIG. 2 illustrates an encoder 200 according to an embodiment of the present invention. The encoder 200 may include a luma transform 220, an OTF transform 230, and a chroma transform 240 that operate on pixel data output by an RGB pixel source 210. The luma transform 220 may determine a linear luminance value from RGB components 210.G, 210.R, 210.B of a pixel. The OTF transform 230 may generate a transformed luminance value from the linear luminance value output from the luma transform 220 and it may generate transformed red and blue color values from the red and blue components 210.R, 210.B of the source pixel. The chroma transform 240 may convert the OTF-transformed red and blue values to corresponding chrominance values.

The luma transform 220 may by connected directly to the source 210 of RGB content. The RGB content may be represented according to a predetermined protocol such as the Rec709, Rec2020 or DCI P3 protocols. The luma transform 220 may determine a linear luminance value (Y) from the RGB color values 210.R, 210.G, 210.B of a source pixel.

The luma transform 220 may determine the linear luminance value (Y) by an averaging of red, green and blue color values 210.R, 210.G, 210.B of the pixel. The linear luminance value Y may be calculated as a weighted average of the red, green and blue color values 210.R, 210.G, 210.B of the pixel in a linear domain, for example, as $$Y = \frac{h*R + i*G + j*B}{k},$$

where R, G, and B represent the red, green and blue color values 210.R, 210.G, 210.B and h, i, j, k represent weighting factors. In this fashion, the linear luminance value (Y) may be linearly proportional to each of the primary color values (R, G, and B). The weighting factors (h, i, j, k) may be predefined for the encoder 200 and signaled to corresponding decoders. For example, the weighting factors (h, i, j, k) may be predefined according to standards such as the International Commission on Illumination (CIE) 1931 XYZ color space, to allow linear luminance value (Y) to be derived.

The OTF transform 230 may include a plurality of transform units 232, 234, 236, one for red component data 210.R from the signal source 210, one for blue component data 210.B from the signal source 210, and one for luma component data Y output from the luma transform 220. The luma OTF transform unit 236 may generate a transformed luminance value Y_otf from the linear luminance value Y output by the luma transform 220. The red and blue OTF transform units 232, 234 each may generate transformed red and blue color values R_otf and B_otf from the red and blue color values 210.R, 210.B of the source pixel.

The OTF may apply transform functions that account for deviations of image data from true linear representations. The deviations often arise due to characteristics of image capture and/or image display devices, such as cameras and monitors, that either source the RGB data to the system or consume the RGB data. These sources/sinks may cause the RGB data to have non-linear relationship versus the input (intended) color intensity. OTF transforms may include, for example, gamma corrections, Dolby-PQ transforms, point spread functions, line-spread functions or edge-spread functions. Parameters of the OTF transforms may be tuned to the sources 210 from which the RGB data originates or the sinks (not shown) on which the RGB data may be rendered.

The chroma transform 240 may derive chroma values from transformed color values (R_otf and B_otf) and the transformed luminance value (Y_otf) of the pixel. The chroma transform 240 may include a transform unit 242 for red chroma (Cr) and a transform unit 244 for blue chroma (Cb). The chroma transform 240 may determine, via a chroma Cr transform unit 242, a chroma red value (V_otf) based upon a difference between a transformed red value (R_otf) and the transformed luminance value (Y_otf) of the pixel, and may determine, via a chroma Cb transform unit 244, a chroma blue value (U_otf) based upon a difference between a transformed blue value (B_otf) and the transformed luminance value (Y_otf) of the pixel.

The encoder 200 optionally may include a quantizer 250. The quantizer 250 may include a plurality of quantizer units 252, 254, 256, one for chroma red value (V_otf), one for chroma blue value (U_otf), and one for transformed luminance value (Y_otf).

The quantizer unit 252 may be selected such that Y_otf obtained represents a value within a range, for example with a value between the range of (0 to 1), a normalized range representing a maximum magnitude of 1. In this fashion, Y_otf may be normalized, which may be digital data with some predefined bit size.

The quantizer units 254 and 256 may be selected to scale the chroma red value (V_otf) and the chroma blue value (U_otf). Scaling may occur, for example, as $$U\_otf = \alpha * (B\_otf - Y\_otf), \text{ and}$$

$$V\_otf = \beta * (R\_otf - Y\_otf).$$

Here the scaling factors α and β may depend on the transformed red value (R_otf), the transformed blue value (B_otf), and the transformed luminance value (Y_otf) of the pixel, and may be selected such that U_otf and V_otf obtained/quantized represent values within a range, for example representing values between the range of (−0.5 to 0.5), a normalized range representing a magnitude of 1. In this fashion, U_otf and V_otf may be normalized. The scaling factors α and β may be selected independently for different regions of a source image or separately for each image. The scaling factors α and β may be encoded in the image data or may be signaled in the image head information, such that corresponding decoders may use the selected scaling factors α and β for the corresponding pixel region or corresponding image.

By generating the linear luminance value (Y) using the luma transform 220 in the linear domain from the primary color values (R, G, and B), the linear luminance value (Y) may be obtained in high accuracy, which reduces error and noise further down stream in the encoding of the luminance value.

The encoder 200 optionally may include a subsampler 260 to perform subsampling (for example, by spatial subsampling) the plurality of chroma values (V_otf and U_otf) for output. For example, the subsampler 260 may spatially subsample the chroma values (V_otf and U_otf), by for example, calculating a set of chroma values (V_otf and U_otf) for multiple adjacent pixels, using multiple sets of chroma values (V_otf and U_otf) of the multiple adjacent pixels. This subsampling may be performed by the subsampler 260 as required by settings or parameters of the encoder 200, for example according to 4:2:2, 4:2:0 or 4:1:1 chroma subsampling adopted in standards such as H.264 and HEVC.

The encoder 200 may include one or more processors or processor cores, memories, and/or non-transitory storage storing computer programs or software in some or all of the components above to perform the above illustrated encoding.

FIG. 3 illustrates an encoder 300 according to another embodiment of the present invention. The encoder 300 may include a luma transform 320, an OTF transform 330, and a chroma transform 340 that operate on pixel data output by an RGB pixel source 310. The luma transform 320 may determine a linear luminance value from RGB components 310.G, 310.R, 310.B of a pixel. The OTF transform 330 may generate a transformed luminance value from the linear luminance value output from the luma transform 320 and it may generate transformed red and blue color values from the red and blue components 310.R, 310.B of the source pixel. The chroma transform 340 may convert the OTF-transformed red and blue values to corresponding chrominance values.

The luma transform 320 may be connected directly to the source 310 of RGB content. The RGB content may be represented according to a predetermined protocol such as the Rec709, Rec2020 or DCI P3 protocols. The luma transform 320 may determine a linear luminance value (Y) from the RGB color values 310.R, 310.G, 310.B of a source pixel.

The luma transform 320 may determine the linear luminance value (Y) by an averaging the red, green and blue color values 310.R, 310.G, 310.B of the pixel. The linear luminance value Y may be calculated as a weighted average of the red, green and blue color values 310.R, 310.G, 310.B of the pixel in a linear domain, for example, as $$Y = \frac{h*R + i*G + j*B}{k},$$

where K, G, and B represent the red, green and blue color values 310.R, 310.G, 310.B and h, i, j, k represent weighting factors. In this fashion, the linear luminance value (Y) may be linearly proportional to each of the primary color values (R, G, and B). The weighting factors (h, i, j, k) may be predefined for the encoder 300 and signaled to corresponding decoders. For example, the weighting factors (h, i, j, k) may be predefined according to standards such as the International Commission on Illumination (CIE) 1931 XYZ color space, to allow linear luminance value (Y) to be derived.

According to this embodiment, the encoder 300 may include a downsampler 370, which may include a luma downsampler 376, red downsampler 372, and blue downsampler 374, to spatially downsample the linear luminance value (Y) and more than one of the primary color values (R and B) of the pixel, to generate downsampled luminance value (Y') and downsampled color values (R' and B'). This downsampling may be performed as required by settings or parameters of the encoder 300, for example but not limited according to 4:2:2, 4:2:0 or 4:1:1 chroma subsampling adopted in standards such as H.264 and HEVC.

By having a downsampler 360 perform spatial downsampling of Y, R and B data in the linear domain before the OTF transform, accuracy of luminance and chroma data may be further improved downstream in the encoder 300, as compared to the encoder 200 in FIG. 2.

The OTF transform 330 may include a plurality of transform units 332, 334, 336, 338, one for downsampled red value (R') from red downsampler 372, one for downsampled blue value (B') from blue downsampler 374, one for downsampled luminance value (Y') from luma downsampler 376, and one for linear luma component data Y output from the luma transform 320. The luma OTF transform unit 338 may generate a transformed luminance value Y_otf from the linear luma component data Y output from the luma transform 320. The luma D OTF transform unit 336 may generate a transformed downsampled luminance value Y'_otf from downsampled luminance value (Y') from luma downsampler 376. The red and blue OTF transform units 332, 334 each may generate transformed red and blue color values R'_otf and B'_otf from the red and blue downsamplers 372 and 374.

The OTF may apply transform functions that account for deviations of image data from true linear representations. The deviations often arise due to characteristics of image capture and/or image display devices, such as cameras and monitors, that either source the RGB data to the system or consume the RGB data. These sources/sinks may cause the RGB data to have non-linear relationship versus the input (intended) color intensity. OTF transforms may include, for example, gamma corrections, Dolby-PQ transforms, point spread functions, line-spread functions or edge-spread functions. Parameters of the OTF transforms may be tuned to the sources 310 from which the RGB data originates or the sinks (not shown) on which the RGB data may be rendered.

The chroma transform 340 may determine a plurality of chroma values based upon corresponding plurality of transformed color values (R'_otf and B'_otf) and the transformed downsampled luminance value (Y'_otf) of the pixel. The chroma transform 340 may include a transform unit 342 for red chroma (Cr) and a transform unit 344 for blue chroma (Cb). The chroma transform 340 may determine, via a chroma Cr transform unit 342, a chroma red value (V_otf) based upon a difference between a transformed red value (R'_otf) and the transformed downsampled luminance value (Y'_otf) of the pixel, and may determine, via a chroma Cb transform unit 344, a chroma blue value (U_otf) based upon a difference between a transformed blue value (B'_otf) and the transformed downsampled luminance value (Y'_otf) of the pixel.

The encoder 300 optionally may include a quantizer 350. The quantizer 350 may include a plurality of quantizer units 352, 354, 356, one for chroma red value (V_otf), one for chroma blue value (U_otf), and one for transformed luminance value (Y_otf).

The quantizer unit 352 may be selected such that Y_otf obtained represents a value within a range, for example with a value between the range of (0 to 1), a normalized range representing a maximum magnitude of 1. In this fashion, Y_otf may be normalized, which may be digital data with some predefined bit size.

The quantizer units 354 and 356 may be selected to scale the chroma red value (V_otf) and the chroma blue value (U_otf). For example, $U\_otf=\alpha(B\_otf-Y\_otf)$, and $V\_otf=\beta(R\_otf-Y\_otf)$. Here the scaling factors $\alpha$ and $\beta$ may depend on the transformed red value (R_otf), the transformed blue value (B_otf), and the transformed luminance value (Y_otf) of the pixel, and may be selected such that U_otf and V_otf obtained/quantized represent values within a range, for example representing values between the range of (−0.5 to 0.5), a normalized range representing a magnitude of 1. In this fashion, U_otf and V_otf may be normalized. The scaling factors $\alpha$ and $\beta$ may be selected independently for each pixel region or for each image. The scaling factors $\alpha$ and $\beta$ may be encoded in the image data or may be signaled in the image head information, such that corresponding decoders may use the selected scaling factors $\alpha$ and $\beta$ for the corresponding pixel region or corresponding image.

By generating the linear luminance value (Y) using the luma transform 320 in the linear domain from the primary color values (R, G, and B), the linear luminance value (Y) may be obtained in high accuracy, which reduces error and noise further down stream in the encoding of the luminance value.

The encoder 300 optionally may include a subsampler 360 to perform subsampling (for example, by spatial subsampling) the plurality of chroma values (V_otf and U_otf) for output. For example, the subsampler 360 may spatially subsample the chroma values (V_otf and U_otf), by for example, calculating a set of chroma values (V_otf and U_otf) for multiple adjacent pixels, using multiple sets of chroma values (V_otf and U_otf) of the multiple adjacent pixels. This subsampling may be performed by the subsampler 360 as required by settings or parameters of the encoder 300, for example according to 4:2:2, 4:2:0 or 4:1:1 chroma subsampling adopted in standards such as H.264 and HEVC.

The encoder 300 may include one or more processors or processor cores, memories, and/or non-transitory storage storing computer programs or software in some or all of the components above to perform the above illustrated encoding.

Figure 4:
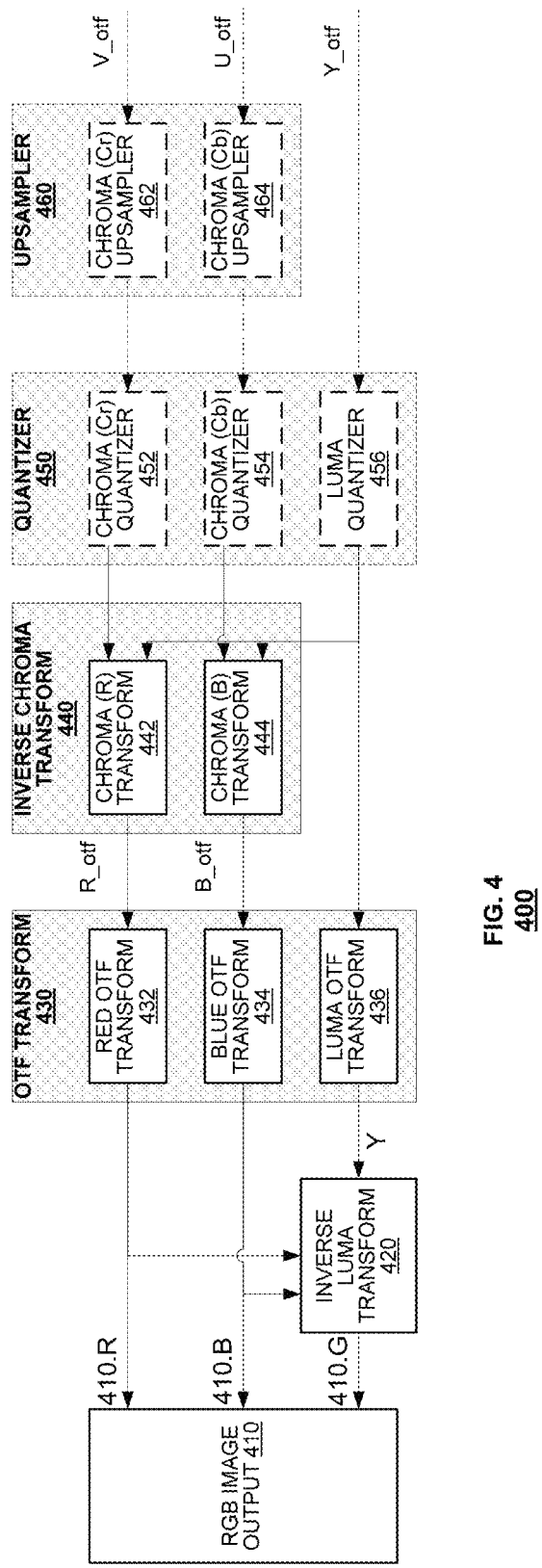
FIG. 4 illustrates a decoder according to an embodiment of the present invention.

FIG. 4 illustrates an decoder 400, which may be used to decode image data generated by encoders 200 and 300, according to an embodiment of the present invention. The decoder 400 may include an inverse luma transform 420, an OTF transform 430, and an inverse chroma transform 440 that operate on encoded image data to generate pixel data output to an RGB pixel output 410. The inverse chroma transform 440 may convert the encoded chrominance values U_otf, V_otf of image data to corresponding red and blue values R_otf, B_otf. The OTF transform 430 may generate a linear luminance value Y from the encoded luminance value and it may generate linear red and blue components 410.R, 410.B from the red and blue color values from the inverse chroma transform 440. The inverse luma transform 420 may determine a linear green color value 410.G from linear red and blue components 410.R, 410.B and the linear luminance value Y.

The inverse chroma transform 440 may determine a plurality of color values (R_otf and B_otf) based upon corresponding plurality of encoded chroma values (V_otf and U_otf) and the encoded luminance value (Y_otf) of the pixel. The inverse chroma transform 440 may include a transform unit 442 for red chroma (R) and a transform unit 444 for blue chroma (B). The inverse chroma transform 440 may determine, via a chroma R transform unit 442, a red value (R_otf) based upon a difference between an encoded chroma red value (V_otf) and the encoded luminance value (Y_otf) of the pixel, and may determine, via a chroma B transform unit 444, a blue value (B_otf) based upon a difference between an encoded chroma blue value (U_otf) and the encoded luminance value (Y_otf) of the pixel.

The OTF transform 430 may include a plurality of transform units 432, 434, 436, one for red color value R_otf from the inverse chroma transform 440, one for blue color value B_otf from the inverse chroma transform 440, and one for encoded luminance value Y_otf. The luma OTF transform unit 436 may generate a luminance value Y from the encoded luminance value Y_otf. The red and blue OTF transform units 432, 434 each may generate linear red and blue color values 410.R, 410.B from the red and blue color values R_otf and B_otf from the inverse chroma transform 440.

The OTF may apply transforms that account for deviations of image data from true linear representations. The deviations often arise due to characteristics of image capture and/or image display devices, such as cameras and monitors, that either source the RGB data to the system or consume the RGB data. These sources/sinks may cause the RGB data to have non-linear relationship versus the input (intended) color intensity. OTF transforms may include, for example, gamma corrections, Dolby-PQ transforms, point spread functions, line-spread functions or edge-spread functions. Parameters of the OTF transforms may be tuned to the sources 410 from which the RGB data originates or the sinks (not shown) on which the RGB data may be rendered.

The inverse luma transform 420 may by connected directly to the output 410 to output RGB content. The RGB content may be represented according to a predetermined protocol such as the Rec709, Rec2020 or DCI P3 protocols. The inverse luma transform 420 may determine a linear green color value (G) from the linear luminance value (Y) and the linear red and blue color values 410.R, 410.B.

The inverse luma transform 420 may determine the linear green color value (G) by inverse averaging the linear luminance value (Y) and the linear red and blue color values 410.R, 410.B of the pixel. The linear green color value (G) may be calculated as a difference between the linear luminance value Y, and the linear red and blue color values 410.R, 410.B of the pixel in a linear domain, for example, as $$G = \frac{(k*Y - h*R - j*B)}{i},$$

where R, G, and B represent the linear red, green and blue color values 410.R, 410.G, 410.B and h, i, j, k represent weighting factors. In this fashion, the linear green color value (G) may be linearly proportional to each of the primary color values (R, and B) and the linear luminance value (Y). The weighting factors (h, i, j, k) may be predefined for the decoder 400 and signaled to corresponding encoders. For example, the weighting factors (h, i, j, k) may be predefined according to standards such as the International Commission on Illumination (CIE) 1931 XYZ color space, to allow linear green color value (G) to be derived.

The decoder 400 optionally may include a subsampler 460 to perform upsampling (for example, by spatial upsampling) the plurality of encoded chroma values (V_otf and U_otf). For example, the subsampler 460 may spatially upsample the input encoded chroma values (V_otf and U_otf), by for example, calculating multiple sets of chroma values for multiple adjacent pixels, using one of encoded chroma values (V_otf and U_otf) for the group of the multiple adjacent pixels. This upsampling may be performed by the upsampler 460 as required by settings or parameters of the decoder 400, for example according to 4:2:2, 4:2:0 or 4:1:1 chroma upsampling adopted in standards such as H.264 and HEVC.

The decoder 400 optionally may include a quantizer 450. The quantizer 450 may include a plurality of quantizer units 452, 454, 456, one for encoded chroma red value (V_otf), one for chroma blue value (U_otf), and one for encoded luminance value (Y_otf).

The quantizer unit 452 may be selected such that Y_otf obtained represents a value within a range, for example with a value between the range of (0 to 1), a normalized range representing a maximum magnitude of 1. In this fashion, Y_otf may be normalized, which may be digital data with some predefined bit size.

The quantizer units 454 and 456 may be selected to scale the chroma red value (V_otf) and the chroma blue value (U_otf). For example, U_otf=α(B_otf−Y_otf), and V_otf=β (R_otf−Y_otf). Here the scaling factors α and β may depend on the transformed red value (R_otf), the transformed blue value (B_otf), and the transformed luminance value (Y_otf) of the pixel, and may be selected such that U_otf and V_otf obtained/quantized represent values within a range, for example representing values between the range of (−0.5 to 0.5), a normalized range representing a magnitude of 1. In this fashion, U_otf and V_otf may be normalized. The scaling factors α and β may be selected independently for each pixel region or for each image. The scaling factors α and β may be decoded in the image data or may be signaled in the image head information, such that corresponding decoders may use the selected scaling factors α and β for the corresponding pixel region or corresponding image.

By generating the linear luminance value (Y) using the inverse luma transform 420 in the linear domain from the primary color values (R, G, and B), the linear luminance value (Y) may be obtained in high accuracy, which reduces error and noise further down stream in the decoding of the luminance value.

The decoder 400 may include one or more processors or processor cores, memories, and/or non-transitory storage storing computer programs or software in some or all of the components above to perform the above illustrated decoding.

FIG. 5 illustrates an encoding process 500 according to an embodiment of the present invention. According to an embodiment, the encoding process 500 may include, at block 510, receiving a plurality of primary color values of a pixel. At block 520, a luma transform may quantize a linear luminance value based upon a plurality of primary color values of a pixel. At block 530, a transformer may generate a transformed luminance value based upon the linear luminance value and a plurality of transformed color values based upon corresponding more than one of the primary color values of the pixel. At block 540, a chroma transform may derive a plurality of chroma values based upon corresponding plurality of transformed color values and the transformed luminance value of the pixel. At block 550, the encoder may adjust the plurality of chroma values for output.

FIG. 6 illustrates an decoding process 600 according to an embodiment of the present invention. According to an embodiment, the decoding process 600 may include, at block 610, receiving a plurality of chroma values and a transformed luminance value of a pixel. At block 620, the decoder may upsample the plurality of chroma values at input. At block 630, an inverse chroma transform may derive a plurality of transformed color values based upon a plurality of chroma values and a transformed luminance value of a pixel. At block 640, an transformer may generate a linear luminance value based upon the transformed luminance value and more than one of the primary color values based upon the corresponding plurality of transformed color values of the pixel. At block 650, an inverse luma transform may derive another primary color value (G) based upon the linear luminance value and the more than one of the primary color values of the pixel.

FIG. 7 illustrates exemplary image data that demonstrates advantages of the foregoing embodiments. FIG. 7(*a*) illustrates image data with high frequency content extending in the horizontal direction, with the left half of the image constituting alternating stripes of bright blue and black and the right half of the image constituting alternating stripes of a darker blue and black. FIG. 7(*b*) illustrates image data that may be obtained by a coding process that performs an OTF transform directly from RGB data, then a linear transform of the OTF-transformed RGB data to YUV. In FIG. 7(*b*), the bright blue strips from the left-hand side of FIG. 7(*a*) are much darker than the source image. The darker blue strips also exhibit color errors as compared to the source image.

FIG. 7(*c*) illustrates image data that may be obtained by a coding process performed according to FIG. 2. In FIG. 7(*c*), both the bright blue stripes and the dark blue stripes from the left-hand side of FIG. 7(*a*) have fewer errors than in FIG. 7(*b*). Thus, an image processed according to the techniques of the present disclosure are expected to have fewer errors than an image that is processed according to an OTF transform that operates directly on RGB pixel data, then a linear transform of the OTF-transformed RGB data to a YUV domain.

To illustrate the usefulness of the second method in some extreme cases, here we show three images to be compared in FIG. 6. The original image (left) contains some very, and cannot be maintained using conventional method, even the previous method we proposed. But the high precision method described above can deal with such extreme signal very effectively.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. An encoder, comprising:
   a luma transform to determine a linear luminance value from a plurality of color component values of a pixel in a source color space;
   a transformer to generate a transformed luminance value from the linear luminance value and to generate transformed color values from each of the plurality of color component values of the pixel in the source color space, the transformer operating according to optical transform functions (OTFs) associated with a device that processes the pixel in the source color space; and
   a chroma transform to determine chroma values of the pixel from the plurality of transformed source color space color values and the transformed luminance value of the pixel.

2. The encoder of claim 1, wherein the encoder downsamples the chroma values for output.

3. The encoder of claim 2, further comprising a downsampler to spatially downsample the linear luminance and the plurality of color component values of the pixel in the source color space prior to application of an OTF.

4. The encoder of claim 1, wherein the luma transform determines the linear luminance value by weighted averaging the plurality of color component values of the pixel.

5. The encoder of claim 1, wherein the chroma transform determines a chroma red value based upon a difference between a transformed red value and the transformed luminance value of the pixel, and determines a chroma blue value based upon a difference between a transformed blue value and the transformed luminance value of the pixel.

6. The encoder of claim 1, wherein the transformer downsamples the linear luminance value and the plurality of color component values of the pixel, before generating the transformed luminance value from the linear luminance value and the plurality of transformed source color space color values from each of the plurality of color component values of the pixel in the source color space.

7. The encoder of claim 1, wherein the chroma transform generates a plurality of scaling factors each corresponding to one of the chroma values of the pixel.

8. The encoder of claim 1, wherein the device is a source device that generates the pixel values in the source color space and the OTFs indicate transforms associated with the source device.

9. The encoder of claim 1, wherein the OTFs include gamma corrections, Dolby-PQ transforms, point spread functions, line-spread or edge-spread functions.

10. The encoder of claim 1, wherein the encoder is configured to downsample the linear luminance value and downsample the plurality of color component values prior to application of respective OTFs.

11. The encoder of claim 1, wherein the encoder is configured to quantize the transformed luminance value prior to application of an OTF.

12. A decoder, comprising:
   an inverse chroma transform to determine transformed destination color space color values from encoded chroma values and a transformed luminance value of a pixel in a destination color space;
   a transformer to generate a linear luminance value from the transformed luminance value and to generate a plurality of color component values from a corresponding one of the transformed destination color space color values of the pixel in the destination color space, the transformer operating according to optical transform functions (OTFs) associated with a device that processes the pixel in the destination color space; and
   an inverse luma transform to determine another color component color value from the linear luminance value and the plurality of color component values of the pixel in the destination color space.

13. The decoder of claim 12, wherein the decoder upsamples the encoded chroma values at an input of the decoder.

14. The decoder of claim 13, further comprising an upsampler to spatially upsample the encoded chroma values prior to application of an OTF.

15. The decoder of claim 12, wherein the inverse luma transform determines the another color component color value by inverse weighted averaging the linear luminance value and the plurality of color component values of the pixel in the destination color space.

16. The decoder of claim 12, wherein the inverse chroma transform determines a transformed red value based upon a chroma red value and the transformed luminance value of the pixel, and determines a transformed blue value based upon a chroma blue value and the transformed luminance value of the pixel.

17. The decoder of claim 12, wherein the inverse chroma transform uses a plurality of scaling factors each to determine a corresponding one of the transformed destination color space color values.

18. The decoder of claim 12, wherein the device is a destination device that consumes the pixel values in the destination color space and the OTFs indicate transforms associated with the destination device.

19. The decoder of claim 12, wherein the OTFs include gamma corrections, Dolby-PQ transforms, point spread functions, line-spread or edge-spread functions.

20. The decoder of claim 12, wherein the decoder is configured to upsample the transformed luminance value and upsample the transformed destination color space values prior to application of respective OTFs.

21. The decoder of claim 12, wherein the decoder is configured to quantize the transformed luminance value prior to application of an OTF.

22. A method of encoding, comprising:
determining, by a luma transform, a linear luminance value from a plurality of color component values of a pixel in a source color space;
generating, by a transformer, a transformed luminance value from the linear luminance value, and generating, by the transformer, transformed color values from each of the plurality of color component values of the pixel in the source color space according to optical transform functions (OTFs) associated with a device that processes the pixel in the source color space; and
determining, by a chroma transform, chroma values of the pixel from the plurality of transformed source color space color values and the transformed luminance value of the pixel.

23. The method of claim 22, further comprising downsampling, by an encoder, the chroma values for output.

24. The method of claim 23, wherein the downsampling includes spatial downsampling of the chroma values prior to application of an OTF.

25. The method of claim 22, wherein the luma transform determines the linear luminance value by weighted averaging the plurality of color component values of the pixel.

26. The method of claim 22, wherein the chroma transform determines a chroma red value based upon a difference between a transformed red value and the transformed luminance value of the pixel, and determines a chroma blue value based upon a difference between a transformed blue value and the transformed luminance value of the pixel.

27. The method of claim 22, wherein the transformer downsamples the linear luminance value and the plurality of color component values of the pixel, before generating the transformed luminance value from the linear luminance value and the plurality of transformed source color space color values from each of the plurality of color component values of the pixel in the source color space.

28. The method of claim 22, wherein the chroma transform generates a plurality of scaling factors each corresponding to one of the chroma values of the pixel.

29. The method of claim 22, wherein the generating, by the transformer, is carried out at a source device that generates the pixel values in the source color space and the OTFs indicate transforms associated with the source device.

30. The method of claim 22, wherein the encoding includes downsampling the linear luminance value and downsampling the plurality of color component values prior to application of respective OTFs.

31. The method of claim 22, wherein the encoding includes quantizing the transformed luminance value prior to application of an OTF.

32. A method of decoding, comprising:
determining, by an inverse chroma transform, transformed destination color space color values from encoded chroma values and a transformed luminance value of a pixel in a destination color space;
generating, by a transformer, a linear luminance value from the transformed luminance value, and generating, by the transformer, a plurality of color component values from a corresponding one of the transformed destination color space color values of the pixel in the destination color space, the transformer operating according to optical transform functions (OTFs) associated with a device that processes the pixel in the destination color space; and
determining, by an inverse luma transform, another color component color value from the linear luminance value and the plurality of color component values of the pixel in the destination color space.

33. The method of claim 32, further comprising upsampling, by a decoder, the encoded chroma values at an input of the decoder.

34. The method of claim 33, wherein the upsampling includes spatial upsampling of the encoded chroma values prior to application of an OTF.

35. The method of claim 32, wherein the inverse luma transform determines the another color component color value by inverse weighted averaging the linear luminance value and the plurality of color component values of the pixel in the destination color space.

36. The method of claim 32, wherein the inverse chroma transform determines a transformed red value based upon a chroma red value and the transformed luminance value of the pixel, and determines a transformed blue value based upon a chroma blue value and the transformed luminance value of the pixel.

37. The method of claim 32, wherein the inverse chroma transform uses a plurality of scaling factors each to determine a corresponding one of the transformed destination color space color values.

38. The method of claim 32, wherein the generating, by the transformer, is carried out at a destination device that consumes the pixel values in the destination color space and the OTFs indicate transforms associated with the destination device.

39. The method of claim 32, wherein the decoding includes upsampling the transformed luminance value and upsampling the transformed destination color space prior to application of respective OTFs.

40. The method of claim 32, further comprising quantizing the transformed luminance value prior to application of an OTF.

* * * * *